(12) United States Patent
Snyder

(10) Patent No.: US 10,752,375 B2
(45) Date of Patent: Aug. 25, 2020

(54) AIRCRAFT SYSTEM

(71) Applicant: Rolls-Royce North American Technologies Inc., Indianapolis, IN (US)

(72) Inventor: Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 66 days.

(21) Appl. No.: 15/875,616

(22) Filed: Jan. 19, 2018

(65) Prior Publication Data

US 2018/0155051 A1 Jun. 7, 2018

Related U.S. Application Data

(63) Continuation of application No. 14/204,638, filed on Mar. 11, 2014, now Pat. No. 9,908,635.

(60) Provisional application No. 61/799,853, filed on Mar. 15, 2013.

(51) Int. Cl.
*F01D 13/00* (2006.01)
*B64D 41/00* (2006.01)
*F02C 6/00* (2006.01)

(52) U.S. Cl.
CPC .............. *B64D 41/00* (2013.01); *F01D 13/00* (2013.01); *F02C 6/00* (2013.01); *F05D 2220/34* (2013.01)

(58) Field of Classification Search
CPC ... B64D 41/00; F02C 6/00; F02C 6/08; F02C 7/16; F02C 7/18; F02C 7/185; F01D 13/00; F01D 11/24; F05D 2220/34; F05D 2270/122; F05D 2270/301; F05B 2220/10; F05B 2220/706; F02K 7/16; F02K 3/08; F02K 3/105; F02K 3/115
See application file for complete search history.

(56) References Cited

U.S. PATENT DOCUMENTS

| | | | |
|---|---|---|---|
| 2,519,130 A | 8/1950 | Arnold | |
| 2,706,255 A | 4/1955 | Breaux et al. | |
| 2,893,204 A | 7/1959 | Anderson et al. | |
| 4,224,790 A * | 9/1980 | Christensen | F02K 7/16 60/224 |
| 4,934,154 A | 6/1990 | Altoz et al. | |
| 5,174,719 A | 12/1992 | Walsh et al. | |
| 5,201,182 A | 4/1993 | Grignon et al. | |
| 5,956,960 A * | 9/1999 | Niggeman | B64D 13/06 60/785 |

(Continued)

*Primary Examiner* — Lawrence Averick
(74) *Attorney, Agent, or Firm* — Barnes & Thornburg LLP

(57) ABSTRACT

An aircraft capable of operating at a variety of speeds includes a power plant and an auxiliary turbine. The auxiliary turbine can be a ram air turbine used to expand and cool an airflow and provide work. The cooled airflow from the auxiliary turbine can be used in a heat exchange device such as, but not limited to, a fuel/air heat exchanger. In one embodiment the cooled airflow can be used to exchange heat with a compressor airflow being routed to cool a turbine. Work developed from the auxiliary turbine can be used to power a heating device and rotate a device to add work to a shaft of the aircraft power plant. In one form the aircraft power plant is a gas turbine engine and the work developed from the auxiliary turbine is used to heat a combustor flow or to drive a shaft that couples a turbine and a compressor.

12 Claims, 5 Drawing Sheets

(56) References Cited

U.S. PATENT DOCUMENTS

| | | |
|---|---|---|
| 6,127,758 A | 10/2000 | Murry et al. |
| 6,270,309 B1 | 8/2001 | Ghetzler et al. |
| 6,580,179 B2 | 6/2003 | Eccles et al. |
| 6,776,022 B2 | 8/2004 | Kula et al. |
| 7,614,239 B2 * | 11/2009 | Herzog .................. F01D 13/00 60/778 |
| 8,424,800 B2 | 4/2013 | Finney |
| 8,657,227 B1 | 2/2014 | Bayliss et al. |
| 8,882,030 B2 | 11/2014 | Loison |
| 2002/0122717 A1 | 9/2002 | Ghetzler et al. |
| 2006/0260323 A1 | 11/2006 | Moulebhar |
| 2007/0267540 A1 | 11/2007 | Atkey et al. |
| 2008/0245054 A1 | 10/2008 | Martensson et al. |
| 2011/0315815 A1 | 12/2011 | Finney |
| 2012/0128487 A1 | 5/2012 | Eames |
| 2012/0291426 A1 | 11/2012 | Loison |
| 2012/0318914 A1 | 12/2012 | Rajashekara et al. |
| 2014/0090395 A1 | 4/2014 | Appukuttan et al. |

* cited by examiner

AIRCRAFT SYSTEM

PRIORITY CLAIM

This application is a continuation of U.S. patent application Ser. No. 14/204,638 filed Mar. 11, 2014, which claims priority to and the benefit of U.S. Provisional Application Ser. No. 61/799,853, filed Mar. 15, 2013, each of which is now expressly incorporated by reference herein.

FIELD OF THE DISCLOSURE

The present disclosure relates generally to aircraft systems, and more specifically, but not exclusively, to aircraft power plants and auxiliary systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Providing aircraft with an ability to cool components and/or configure an aircraft power plant to interact with an auxiliary air turbine remains an area of interest. Some existing systems have various shortcomings relative to certain applications. Accordingly, there remains a need for further contributions in this area of technology.

SUMMARY

The present disclosure may comprise one or more of the following features and combinations thereof.

One embodiment of the present disclosure is a unique aircraft power plant coupled with a thermal and power system that includes an auxiliary air turbine. Other embodiments include apparatuses, systems, devices, hardware, methods, and combinations for providing a cold heat sink for cooling devices aboard an aircraft or engine when a fuel sink has been exhausted and there are no cold air streams, which is typical of supersonic flight.

These and other features of the present disclosure will become more apparent from the following description of the illustrative embodiments.

DETAILED DESCRIPTION OF THE DRAWINGS

Figure 1:
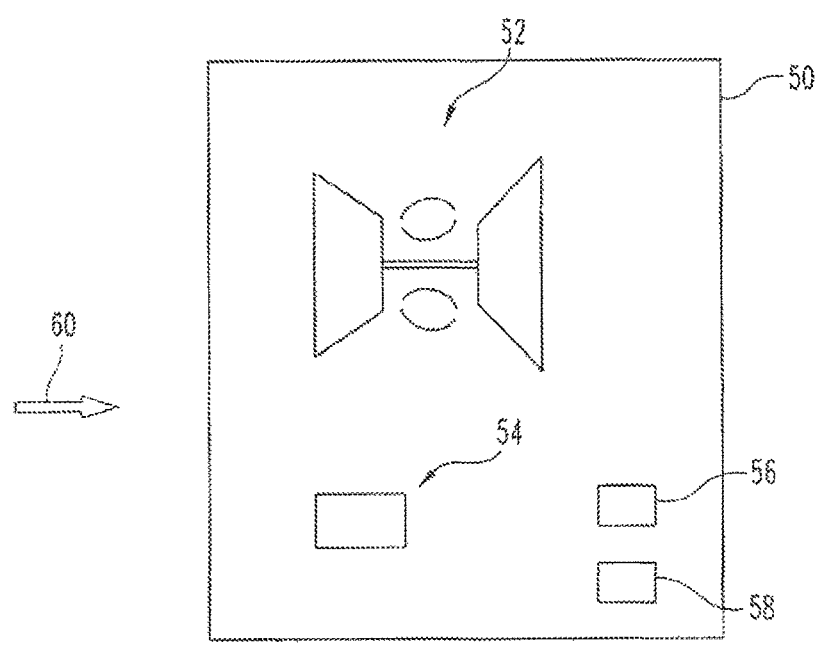
FIG. 1 depicts one embodiment of the present application.

For the purposes of promoting an understanding of the principles of the disclosure, reference will now be made to a number of illustrative embodiments illustrated in the drawings and specific language will be used to describe the same.

With reference to FIG. 1, an aircraft 50 is shown having a gas turbine engine 52 in the form of a gas turbine engine and an auxiliary turbine 54 which can take the form of a ram air turbine. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles such as dual-stage to orbit vehicles having an air breathing first stage. The aircraft 50 may operate at a variety of speeds and includes a sensor 56 and controller 58.

The sensor 56 measures or estimates aircraft flight condition such as speed and altitude, to set forth just two non-limiting examples, and can output any variety of data whether sensed, calculated, or otherwise. For example, the sensor 56 can sense and output conditions such as static temperature, static pressure, total temperature, and/or total pressure, among possible others. In addition, the sensor 56 can output calculated values such as, but not limited to, equivalent airspeed, altitude, and Mach number. Any number of other sensed conditions or calculated values can also be output. The sensor 56 provides data to the controller 58 and can output values in either analog or digital form.

The controller 58 is provided to monitor and control engine operations. The controller 58 can be comprised of digital circuitry, analog circuitry, or a hybrid combination of both of these types. Also, the controller 58 can be programmable, an integrated state machine, or a hybrid combination thereof. The controller 58 can include one or more Arithmetic Logic Units (ALUs), Central Processing Units (CPUs), memories, limiters, conditioners, filters, format converters, or the like which are not shown to preserve clarity. In one form, the controller 58 is of a programmable variety that executes algorithms and processes data in accordance with operating logic that is defined by programming instructions (such as software or firmware). Alternatively or additionally, operating logic for the controller 58 can be at least partially defined by hardwired logic or other hardware. In one particular form, the controller 58 is configured to operate as a Full Authority Digital Engine Control (FADEC); however, in other embodiments it may be organized/configured in a different manner as would occur to those skilled in the art. Though only one controller 58 is depicted, some embodiments can include more than one controller 58 which can be capable of interacting with any of the other controllers 58. It should be appreciated that controller 58 can be exclusively dedicated to functions related to the aircraft 50, gas turbine engine 52, and/or the auxiliary turbine 54, or the interactions between and among any of them.

Though the power plant 52 is depicted as a gas turbine engine in the illustrative embodiment, different embodiments can take other aircraft power plant forms including, but not limited to, turbine based combined cycle engines. The gas turbine engine 52 depicted in FIG. 1 is shown as a single spool turbojet engine, but in other embodiments the gas turbine engine 52 can take on a variety of other forms. To set forth just another non-limiting example, the gas turbine engine 52 can take on the form of a turbofan engine. The gas turbine engine can have any number of spools and can be a variable cycle or adaptive cycle engine. The aircraft 50 in the illustrative embodiment also includes the auxiliary turbine 54 that is capable of rotating and generating a power as an airflow is passed through it.

The aircraft 50 is capable of operating at a variety of speeds to produce a movement of incoming air 60 relative to the aircraft 50. The incoming air 60 can be used within the gas turbine engine 52 and the auxiliary turbine 54. The incoming air 60 can be delivered to the gas turbine engine 52 and auxiliary turbine 54 through separate inlets of the aircraft 50, but in some embodiments the incoming air 60 can be provided through a single inlet. The auxiliary turbine 54 receives air from the inlet and in one form includes air that has passed through a passage that bypasses the gas turbine engine 52. In just a few non-limiting examples, the auxiliary turbine 54 can be configured to receive an airflow from a compressor of the power plant 52 or via a passage that delivers an airflow that has not been compressed by the power plant 52 such as would be the case, for example, with ram air. Accordingly, reference may be made in this application to a ram air turbine 54 which will be interpreted as an auxiliary turbine capable of receiving an air that has not been compressed by a compressor and/or capable of receiving air that has flowed through and been compressed by a power plant compressor. In some non-limiting forms, a valve can be used to provide airflow from a compressor of the power plant 52 to the auxiliary turbine 54 at some aircraft speeds and then provide ram air to the auxiliary turbine at other aircraft speeds. The valve can include one or more valves operating to achieve the overall effect of switching sources of air for the auxiliary turbine 54. In some applications a valve could provide compressor air to the auxiliary turbine 54 up to about Mach 2 or 3, or up to Mach numbers lower than 2 or 3, and then switch over to supply ram air to the auxiliary turbine 54 subsequent to that. In some applications the switch over can be lower than Mach 2 or 3. Such compressor air could come from any stage from the compressor, and in one non-limiting form is compressor discharge air. Though not depicted in FIG. 1, in some embodiments the auxiliary turbine 54 is capable of interacting with the gas turbine engine 52, as will be described in various embodiments below. The auxiliary turbine coupled with other power devices in the embodiments herein serve to provide a thermal and power system useful, in some forms, to provide a cold heat sink for cooling devices aboard an aircraft or engine when a fuel sink has been exhausted and there are no cold air streams, which is typical of supersonic flight. Some embodiments, however, may continue use of the fuel as a fuel sink during operation when sufficient heat sink reserve remains in the fuel.

Figure 2:
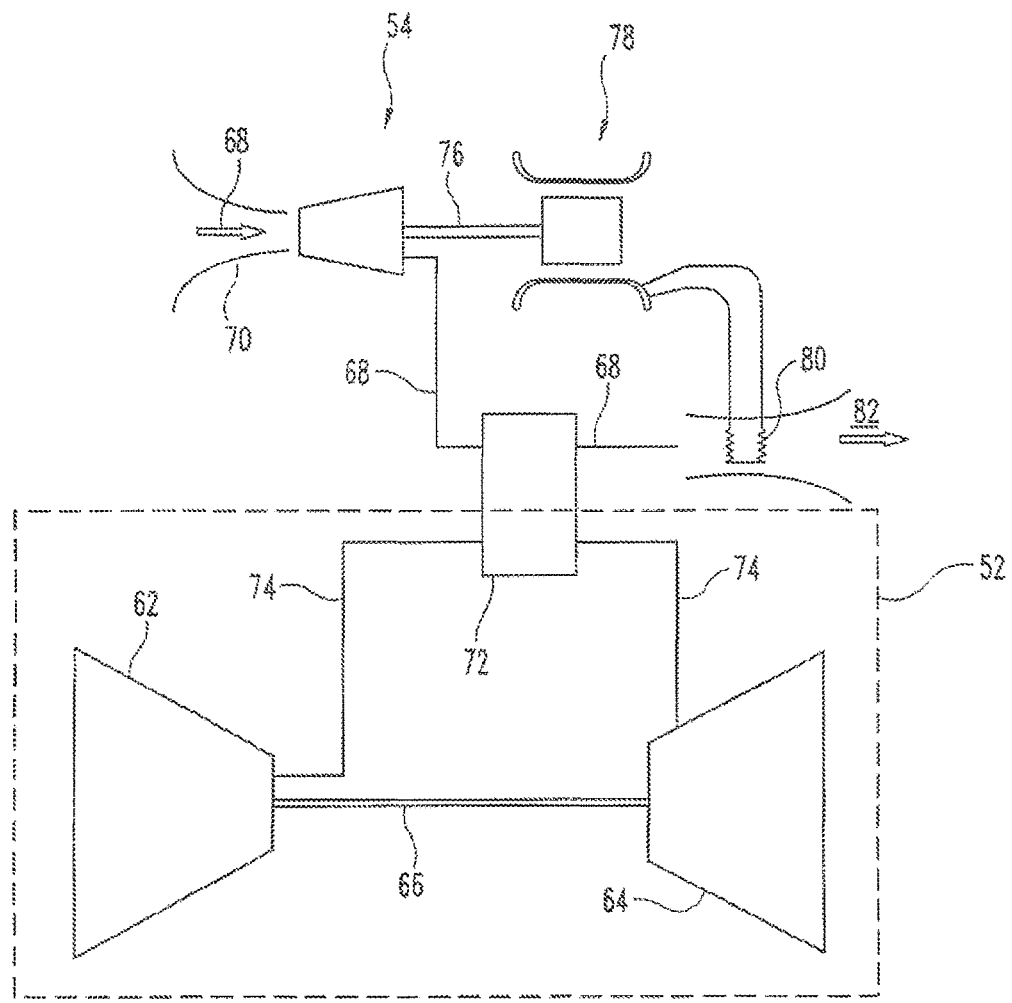
FIG. 2 depicts one embodiment of the present application.

Turning now to FIG. 2, one embodiment showing an interaction between the gas turbine engine 52 and the auxiliary turbine 54 is depicted. The embodiment shown of the gas turbine engine 52 is simplified and omits some features for convenience and ease and depiction. In particular, the gas turbine engine 52 is shown having a compressor 62 coupled with a turbine 64 via an engine shaft 66. A combustor is not explicitly depicted in the figure but will be understood to receive an airflow from the compressor 62 and deliver a stream to the turbine 64. The auxiliary turbine 54 is positioned to receive an auxiliary turbine airflow 68 via a passage 70 upon which the auxiliary turbine airflow 68 is expanded and, therefore, the auxiliary turbine 54 is caused to rotate. Rotation of the auxiliary turbine 54 extracts work from the airflow, resulting in a temperature reduction of airflow 68. The extracted work can be used in the aircraft 50 and/or gas turbine engine 52. The auxiliary turbine 54 can be structured to extract a varying amount of work depending on the auxiliary turbine airflow 68, configuration of the auxiliary turbine 54 as well as demands for the work extracted from the auxiliary turbine 54, and/or the amount of cooled air required, among other possible reasons. Although only one auxiliary turbine 54 is shown, multiple auxiliary turbines 54 can be used.

In the illustrative embodiment the auxiliary turbine 54 interacts with the gas turbine engine 52 by providing the expanded auxiliary turbine airflow 68 to a heat exchange device 72 useful to cool an airflow from the gas turbine engine 52. In other embodiments, however, the auxiliary turbine airflow 68 can be used elsewhere to cool other components of the aircraft 50 and/or power plant 52. In one non-limiting example the auxiliary turbine airflow 68 can be used within environmental control systems to act as a heat sink, to cool a cockpit of the aircraft 50 or avionics, or used as a heating air in a fuel/air heat exchanger, used as sump buffer air, used for sump heat loads such as bearings and gears, used in exhaust nozzle cooling, or as a heat sink for turbine cooling air. Combinations of the uses mentioned above are also contemplated.

The form depicted in FIG. 2 uses the expanded airflow 68 to cool compressor airflow 74. The compressor airflow 74 can be a compressor discharge air in some embodiments, but in other embodiments can originate elsewhere in a compressor of the gas turbine engine 52. The heat exchange device 72 provides thermal communication between the expanded airflow 68 and the compressor airflow 74 and can take a variety of forms, structures, and configurations. In one mode of operation the expanded airflow 68 is relatively cooler than the compressor airflow 74 prior to the heat exchange device 72. Upon exiting the heat exchange device 72 the compressor airflow 74 can have a lower temperature relative to before it entered the heat exchange device 72. The cooled compressor airflow 74 is used in the illustrative embodiment to cool the turbine 64. In some embodiments the cooled compressor airflow 74 is used to cool turbine blades within the turbine 64. Other embodiments can use the cooled compressor airflow 74 for cooling aircraft or other components of the gas turbine engine 52.

The auxiliary turbine 54 provides work via a shaft 76 structured to rotate with the auxiliary turbine 54. Such work derived from the auxiliary turbine 54 can be used for a variety of purposes. In the illustrative embodiment the auxiliary turbine 54 drives an electrical device 78 which takes the form of an electric generator. In other embodiments the electrical device 78 can be a motor/generator. In some forms the electrical device can be used to supply electrical power to aircraft needs. As will be appreciated the electrical device 78 can be used to power a variety of devices, but in the illustrative embodiment is used to power a heater 80 disposed in a flowpath 82 of the aircraft 50 and/or the engine 52. In other embodiments the heater 80 can be used in the combustor, turbine, or fan bypass, or to drive the shaft 66. The heater 80, as well as any other heater herein, can be used as an inter-turbine heater.

The heater 80 is configured as a resistive heating device but in other embodiments can take on other devices capable of providing heat to or heating a medium such as the airflow 68. The heater can be disposed within or around the flowpath 82 among other possible variations and can be capable of generating heat at 4000° F. In some forms the heater 80 can include iridium coated rhenium tubes or wires. In some embodiments the tubes can be supported with ceramic inserts to increase strength. The heater can be an induction heater, in one non-limiting embodiment. Multiple heaters 80 can be used to transfer heat with the working fluid in the flowpath 82. The heater can be used to transfer heat to 82 by radiant, convective, or a combination of the two. In short, the heater can take on a variety of configurations.

The flowpath 82 provides a passage for the conveyance of a variety of working fluids, but in the illustrative embodiment provides passage for the auxiliary turbine airflow 68 after it has been used with the heat exchange device 72. The flowpath 82 can take a variety of forms and can have a variety of cross sectional areas. In some embodiments more than one flowpath 82 can be used. The flowpath 82 can lead to a discharge from the aircraft 50 in some embodiments such that the expanded airflow 68 heated by the heater 80 is dumped overboard. In other embodiments, however, the flowpath 82 can lead to other locations of the aircraft, such as other locations for use in the gas turbine engine 52 (e.g. after the compressor, after the high pressure turbine, etc.).

Figure 3:
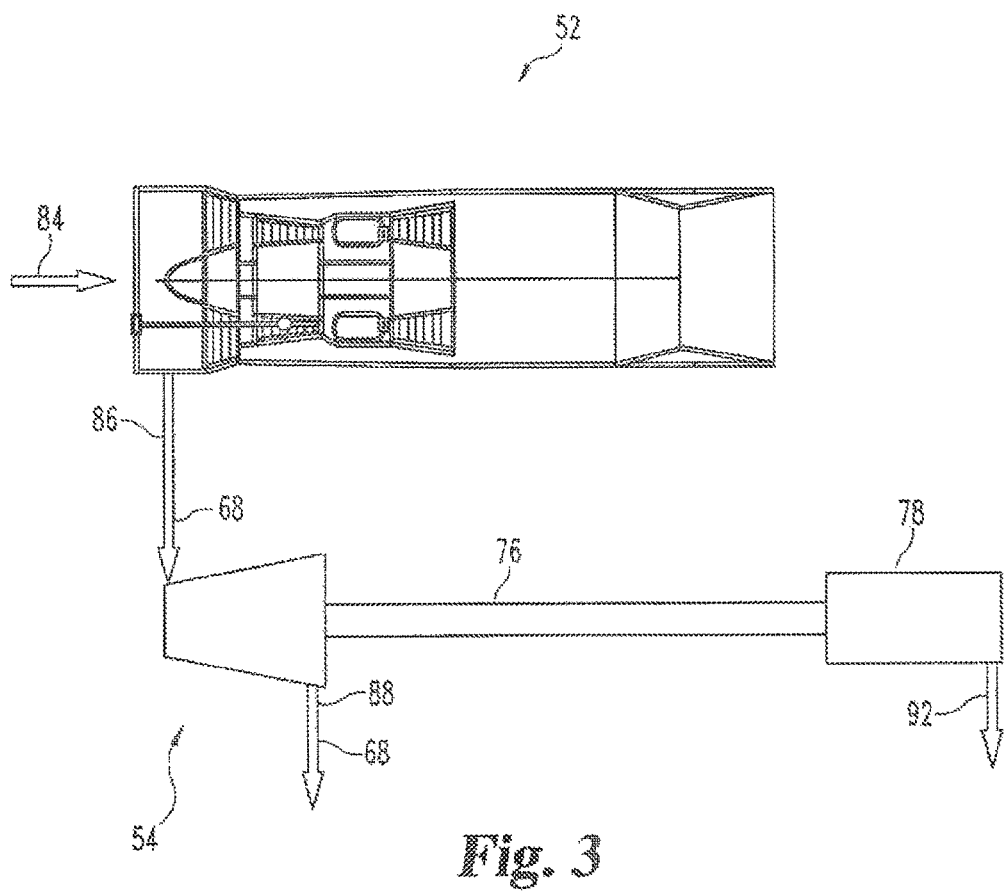
FIG. 3 depicts one embodiment of the present application.

Turning now to FIG. 3, another embodiment of the interaction between the gas turbine engine 52 and the auxiliary turbine 54 is shown. The auxiliary turbine 54 receives an auxiliary turbine airflow 68 from an inlet of the gas turbine engine 52 in the illustrative embodiment. After extracting work from the airflow 68 the auxiliary turbine is used to turn the shaft 76 and rotate the electrical device 78 while also providing a cooler airstream at 88. In one non-limiting mode of operation the aircraft 50 can be operating at a condition 84 characterized by an altitude of 52,000 an ambient temperature of −70° F., ambient pressure of 1.5 psia, and flying a speed of Mach 4. Condition 86 upstream of the auxiliary turbine 54 includes total temperature of the auxiliary turbine airflow 68 of 1140° F. and a flow rate of the airflow 68 can be 1 pound per second. Assuming that efficiency of the auxiliary turbine 54 is 0.9, after the auxiliary turbine 54 extracts work the condition 88 of airflow 68 is at a pressure of 6 psia and a temperature of 240° F., with an available heat sink of 200 kW (which assumes a heating to 1000° F.). The electrical power generated in this mode is depicted at reference numeral 92 and is 240 kW assuming that generator efficiency is 0.95. The auxiliary turbine airflow 68 at condition 88 can be used to cool a variety of components and/or objects, including but not limited to a heat exchanger like a fuel/air heat exchanger, air/air heat exchanger, etc. In still further embodiments, a heat exchanger like a fuel/air heat exchanger, air/air heat exchanger, etc., can alternatively and/or additionally be placed upstream of the auxiliary turbine 54. The purpose of these heat exchangers is to lower the air temperature going into the auxiliary turbine so that the turbine exit air is even cooler or exits at a higher pressure. Other variations and combinations are also contemplated as described herein. The embodiments depicted and discussed in relation to FIG. 3, or also in relation to FIG. 2, can represent a situation in which a fuel sink can no longer accept high heat loads. Such a situation may occur in a high speed aircraft that has operated for long durations such that its fuel can no longer be used as a heat sink.

In some applications the work extracted by the auxiliary turbine 54 is used with the gas turbine engine 52, as described above. To set forth just a few more non-limiting examples, the shaft 76 can be configured to be rotatingly coupled with the engine shaft 66 of the gas turbine engine 52. Though only one shaft 76 is depicted, the auxiliary turbine and associated equipment can be used to drive multiple shafts 76. In one mode of operation the shaft 76 is used to provide a supplemental power to the engine shaft 66. The shaft 76 can also be coupled directly with the engine shaft 66, or can be coupled through one or more mechanical devices such as gears, gearboxes, and/or clutches.

In another non-limiting example, the electrical device 78 can be used to drive other electrical devices. For example, the electrical device 78 can produce electrical power that is used to drive a motor that is coupled with the engine shaft 66. In one mode of operation the motor can be used to provide supplemental power to the engine shaft 66. Such a motor can be coupled to the engine shaft 66 directly or through mechanical devices such as gears, gearboxes, and/or clutches.

In yet another non-limiting example, the electrical device 78 can be used to provide power to a heater in thermal communication with a flow stream of the gas turbine engine. In one non-limiting example, the heater can be in thermal communication with a flow stream downstream of the compressor 62. In a further non-limiting embodiment such a heater can be used to heat air for a combustor and/or turbine section of the gas turbine engine 52. In those embodiments where the gas turbine engine is in the form of a turbofan, the heater can also be used to provide heat to a fan bypass duct. The heater can be located in a number of locations including external and internal to a flow path and can include one or more heaters. The heater can take on any of the forms/configurations/etc. discussed with respect to the heater 80 above.

Figure 4:
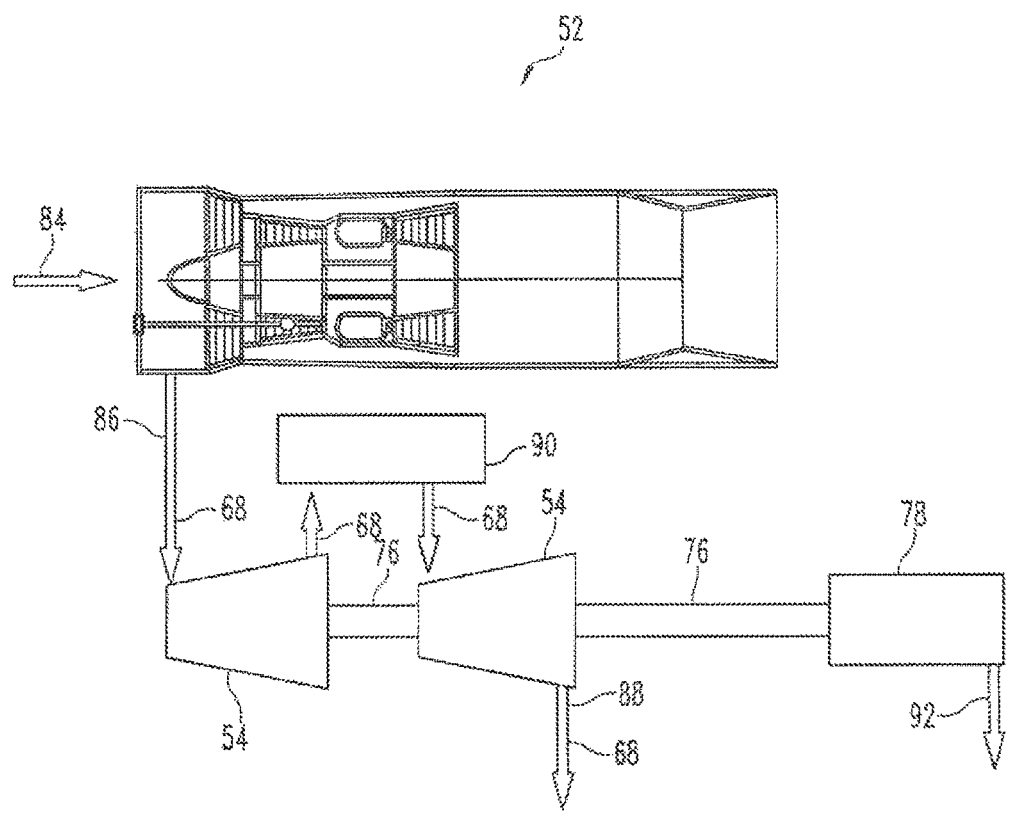
FIG. 4 depicts one embodiment of the present application.

Turning now to FIG. 4, another embodiment of the interaction between the gas turbine engine 52 and the auxiliary turbine 54 is shown. The auxiliary turbine 54 receives an auxiliary turbine airflow 68 from an inlet of the gas turbine engine 52 in the illustrative embodiment. After work has been initially extracted the airflow 68 is used with a heat exchange device 90 to exchange heat with another body and/or fluid. In the illustrative embodiment the heat exchange device 90 is a fuel/air heat exchanger in which the heat exchange device 90 can be used to transfer heat from the airflow 68 with a fuel in the fuel/air heat exchanger. After the airflow 68 has been used with the heat exchange device 90 it is expanded through another auxiliary turbine 54 which can be connected to the first auxiliary turbine 54. In some embodiments the auxiliary turbines 54 in FIG. 4 rotate at the same rate. Both auxiliary turbines 54 can be used to provide power to the electrical device 78 (e.g. a generator). Furthermore, the mass flow rate can, but need not, be the same between the upstream turbine 54 and downstream turbine 54. Differences can be created by any number of causes, for example flow leakage, valving, etc. In one non-limiting embodiment, air can be bled off either before the heat exchange device 90 or after for cooling components. The remaining air would then proceed to be routed as described and depicted herein.

In one mode of operation (non-limiting just as in the other modes of operation) the aircraft 50 can be operating at a condition 84 characterized by an altitude of 52,000 feet, an ambient temperature of −70° F., an ambient pressure of 1.5 psia, and a speed of Mach 4. Condition 86 upstream of the auxiliary turbine 54 includes a total pressure of 157 psia of the auxiliary airflow 68, total temperature of 1140° F., and a flow rate of one (1) pound per second. Assuming that efficiency of the auxiliary turbine 54 is 0.9, after the auxiliary turbine 54 extracts work the condition 88 of airflow 68 is at a pressure of 6 psia and a temperature of 10° F., with an available heat sink of 280 kW (which assumes a heating to 1000° F.). Alternatively, this cool airstream can be used for the aircraft environmental control system, on board inert gas generator system, on board oxygen generator system, avionics, electrical cooling, etc. The electrical power generated in this mode is depicted at reference numeral 92 and is 200 kW assuming that generator and/or motor efficiencies are 0.95.

In some applications the work extracted by the auxiliary turbine 54 is used with the gas turbine engine 52, as described above. To set forth just a few more non-limiting examples, the shaft 76 can be configured to be rotatingly coupled with the engine shaft 66 of the gas turbine engine

52. Though only one shaft 76 is depicted, the auxiliary turbine and associated equipment can be used to drive multiple shafts 76. In one mode of operation the shaft 76 is used to provide a supplemental power to the engine shaft 66. The shaft 76 can be coupled directly with the engine shaft 66, or can be coupled through one or more mechanical devices such as gears, gearboxes, and/or clutches.

In another non-limiting example, the electrical device 78 can be used to drive other electrical devices. For example, the electrical device 78 can used to drive a motor that is coupled with the engine shaft 66. In one mode of operation the motor can be used to provide supplemental power to the engine shaft 66. Such a motor can be coupled to the engine shaft 66 directly or through mechanical devices such as gears, gearboxes, and/or clutches.

In yet another non-limiting example, the electrical device 78 can be used to provide power to a heater in thermal communication with a flow stream of the gas turbine engine. In one non-limiting example, the heater can be in thermal communication with a flow stream downstream of the compressor 62. In a further non-limiting embodiment such a heater can be used to heat an air for a combustor of the gas turbine engine 52. The heater can be located in a number of locations including external and internal to a flow path and can include one or more heaters. In addition, the heater can operate on radiant, convective, or electromagnetic principles, among potential others. The heater can take on any of the forms/configurations/etc. discussed with respect to the heater 80 above.

Figure 5:
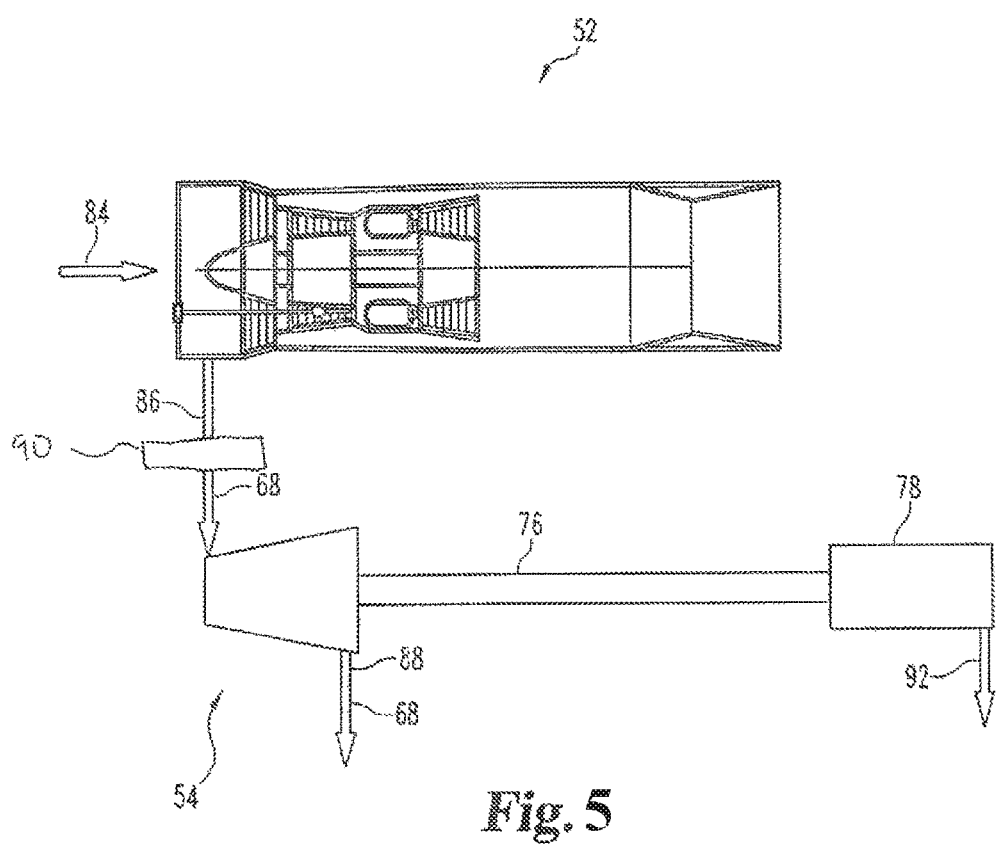
FIG. 5 depicts one embodiment of the present application.

FIG. 5 discloses yet another embodiment. The depiction is similar to that in FIG. 3 with the exception that a heat exchanger 90 is added. The heat exchanger can be a fuel/air heat exchanger in which heat can be transferred to the fuel. The heat exchanger 90 can have the same variations as those discussed above in any of the various other embodiments.

One aspect of the present application provides an apparatus comprising an aircraft capable of operating over a range of Mach numbers, an aircraft power plant structured to provide power to the aircraft and having a combustor, the aircraft power plant characterized by a thermodynamic cycle, and a ram air turbine that receives a working fluid and that rotates to produce a power when the working fluid traverses therethrough, wherein the ram air turbine is structured to extract work from the working fluid and provide one of heat or work to the thermodynamic cycle of the aircraft power plant.

A feature of the present application provides a power device structured to receive power from the ram air turbine.

Another feature of the present application provides wherein the power device is an electric generator.

Yet another feature of the present application provides wherein the aircraft power plant is a gas turbine engine having a compressor and a turbine, and wherein the working fluid discharged from the ram air turbine is used to cool a compressor airflow that has been compressed by the aircraft power plant and that is provided to cool the turbine of the aircraft power plant.

Still another feature of the present application provides a generator structured to provide electrical energy to power a heating device, the heating device positioned to provide heat to the working fluid downstream of the ram air turbine.

A further feature of the present application provides a heat source located to heat an airflow downstream of an aircraft power plant compressor or turbine, the heat source powered by the electric generator.

A still further feature of the present application provides wherein the power device is coupled to a shaft of the aircraft power plant and provides power thereto.

Yet a still further feature of the present application provides a second turbine positioned to receive the working fluid from the ram air turbine, the second turbine in power communication with the power device.

Another aspect of the present application an apparatus comprising an aircraft having a gas turbine engine capable of generating thrust for forward flight, the aircraft also having a thermal and power system that includes a component separate from the gas turbine engine, the thermal and power system structured to provide a thermodynamic effect to the gas turbine engine, the thermal and power system including a bypass passage structured to receive and bypass an airflow to avoid a combustion of the gas turbine engine, an air turbine in fluid communication with the bypass passage, the air turbine operable to reduce a temperature and pressure of the airflow from the bypass passage, a power component rotatingly coupled with and operable to receive power from the air turbine, and wherein the thermal and power system is structured to affect a thermodynamic process of the gas turbine engine.

A feature of the present application provides wherein the thermal and power system is structured to: (1) deliver a heat to a combustor air of the gas turbine engine; (2) provide power to a gas turbine engine spool; or (3) exchange heat between a flow of air and a compressor air routed to a turbine of the propulsion power plant.

Another feature of the present application provides which further includes a second air turbine downstream of the air turbine.

Still another feature of the present application provides a fuel/air heat exchanger structured to transfer heat with a fuel used for the gas turbine engine.

Yet still another feature of the present application provides a heat exchanger having a first passage for the airflow and a second passage for a compressor airflow from the gas turbine engine, the compressor airflow routed to cool a turbine of the gas turbine engine.

A further feature of the present application provides wherein a heater is positioned downstream of the air turbine operable to deliver a heat to the airflow.

Still a further feature of the present application provides wherein the thermal and power system further includes a heat producing component in thermal communication with a mass flow of air downstream of a compressor of the gas turbine engine.

Yet still a further feature of the present application provides wherein the power component is a shaft that couples a compressor and turbine of the gas turbine engine.

Yet another aspect of the present application an apparatus comprising a gas turbine engine having a compressor coupled to a turbine via a shaft and a combustor disposed between the compressor and turbine, the gas turbine engine coupled to an aircraft to provide propulsive power to the aircraft, a ram air turbine separate from the gas turbine engine and having an inlet that accepts an airflow, and means for transferring energy between the ram air turbine and a cycle of the gas turbine engine.

Still another aspect of the present application a method comprising operating an aircraft power plant to provide thrust to an aircraft, turning a ram air turbine as a consequence of operating the aircraft, extracting work from the ram air turbine and generating power, and imparting thermodynamic work or heat to the aircraft power plant as a result of turning the ram air turbine.

A feature of the present application provides wherein the aircraft power plant is a gas turbine engine, wherein the turning includes cooling an airflow through the ram air turbine and the imparting includes cooling a turbine coolant flow from a compressor of the gas turbine engine.

Another feature of the present application provides distributing power to a heater, and which further includes dumping heat via the heater to an airflow downstream of the ram air turbine.

Yet another feature of the present application provides wherein the imparting includes adding heat to an airflow downstream of a compressor of the aircraft power plant.

Still yet another feature of the present application provides delivering a power to a shaft of the aircraft power plant.

A further feature of the present application provides wherein the turning includes flowing a ram air turbine airflow through the ram air turbine, and which further includes expanding the ram air turbine airflow through a turbine downstream of the ram air turbine, the expanding affecting the generating power.

One further aspect of the present application provides an apparatus comprising an aircraft capable of operating over a range of Mach numbers, an aircraft power plant structured to provide power to the aircraft and having a combustor, the aircraft power plant characterized by a thermodynamic cycle, and a thermal and power system including the ram air turbine and that receives the working fluid to produce the power when the working fluid traverses therethrough as well as an attendant drop in temperature of the working fluid, wherein the thermal and power system is structured to provide cooling when a fuel heat sink has been consumed.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An apparatus comprising:
a gas turbine engine structured to provide power to an aircraft to achieve supersonic flight,
the gas turbine engine including an inlet configured to receive an airflow,
a compressor configured to compress the airflow,
a combustor configured to receive a compressed airflow from the compressor, and
a turbine coupled to the compressor and configured to receive a stream of combustion products from the combustor;
a first auxiliary turbine configured to receive an auxiliary turbine airflow from the airflow at the inlet of the gas turbine engine,
extract work from the auxiliary turbine airflow, and discharge the auxiliary turbine airflow in response to the auxiliary turbine airflow traversing through the first auxiliary turbine during operation of the gas turbine engine; and
a fuel/air heat exchanger in fluid communication with the inlet and the first auxiliary turbine and configured to receive the auxiliary turbine airflow from one of the inlet and the first auxiliary turbine,
wherein the fuel/air heat exchanger is in fluid communication with the first auxiliary turbine and located downstream from the first auxiliary turbine such that the auxiliary turbine airflow traverse through the fuel/air heat exchanger during operation of the gas turbine engine,
further comprising a second auxiliary turbine in fluid communication with the first auxiliary turbine and located downstream from the first auxiliary turbine such that the auxiliary turbine airflow traverses through the second auxiliary turbine during operation of the gas turbine engine, and
further comprising an electric generator coupled to the second auxiliary turbine and configured to be driven by the second auxiliary turbine.

2. The apparatus of claim 1,
further comprising the electric generator coupled to the first auxiliary turbine and configured to be driven by the first auxiliary turbine.

3. The apparatus of claim 1,
wherein the fuel/air heat exchanger is located fluidly between the first auxiliary turbine and the second auxiliary turbine.

4. The apparatus of claim 1,
wherein the electric generator is configured to provide power to a shaft of the gas turbine engine during operation of the gas turbine engine.

5. An apparatus comprising:
a gas turbine engine structured to provide power to an aircraft to achieve supersonic flight,
the gas turbine engine including an inlet,
a compressor configured to receive core airflow from the inlet and compress the core airflow to provide compressed core airflow,
a combustor configured to receive the compressed core airflow from the compressor and combust the compressed core airflow to provide a stream of combustion products, and
a turbine coupled to the compressor and configured to receive the stream of combustion products from the combustor; and
a first auxiliary turbine configured to receive an auxiliary turbine airflow from the inlet of the gas turbine engine such that the auxiliary turbine airflow avoids traversing through at least the compressor of the gas turbine engine, the first auxiliary turbine further configured to extract work from the auxiliary turbine airflow and discharge the auxiliary turbine airflow in response to the auxiliary turbine airflow traversing through the first auxiliary turbine during operation of the gas turbine engine,
a heat exchanger in fluid communication with the inlet and the first auxiliary turbine such that the auxiliary turbine airflow is configured to traverse through the heat exchanger, and
a second auxiliary turbine connected with the first auxiliary turbine via a shaft and the heat exchanger is connected fluidly between the first auxiliary turbine and the second auxiliary turbine such that the auxiliary turbine airflow is adapted to flow first through the first auxiliary turbine,
then the heat exchanger, and
then the second auxiliary turbine.

6. The apparatus of claim 5,
further comprising an electric generator connected with the first auxiliary turbine and configured to be driven by rotation of the first auxiliary turbine.

7. The apparatus of claim 5,
further comprising an electric generator and the second auxiliary turbine connected with the first auxiliary turbine via a shaft and wherein the electric generator is connected with the second auxiliary turbine and configured to be driven by rotation of the second auxiliary turbine.

8. The apparatus of claim 5,
wherein the heat exchanger is a fuel/air heat exchanger.

9. The apparatus of claim 8,
further comprising an electric generator connected with the second auxiliary turbine and configured to be driven by the second auxiliary turbine.

10. The apparatus of claim 5,
wherein the heat exchanger is connected fluidly with the first auxiliary turbine downstream from the first auxiliary turbine.

11. The apparatus of claim 5,
wherein the heat exchanger is connected fluidly between the inlet and the first auxiliary turbine.

12. The apparatus of claim 11,
wherein the heat exchanger is a fuel/air heat exchanger.

* * * * *